July 15, 1952     E. G. METZLER     2,603,435
RESILIENT MOUNTING FOR AIRPLANE WINGS
Filed Feb. 6, 1948     2 SHEETS—SHEET 1
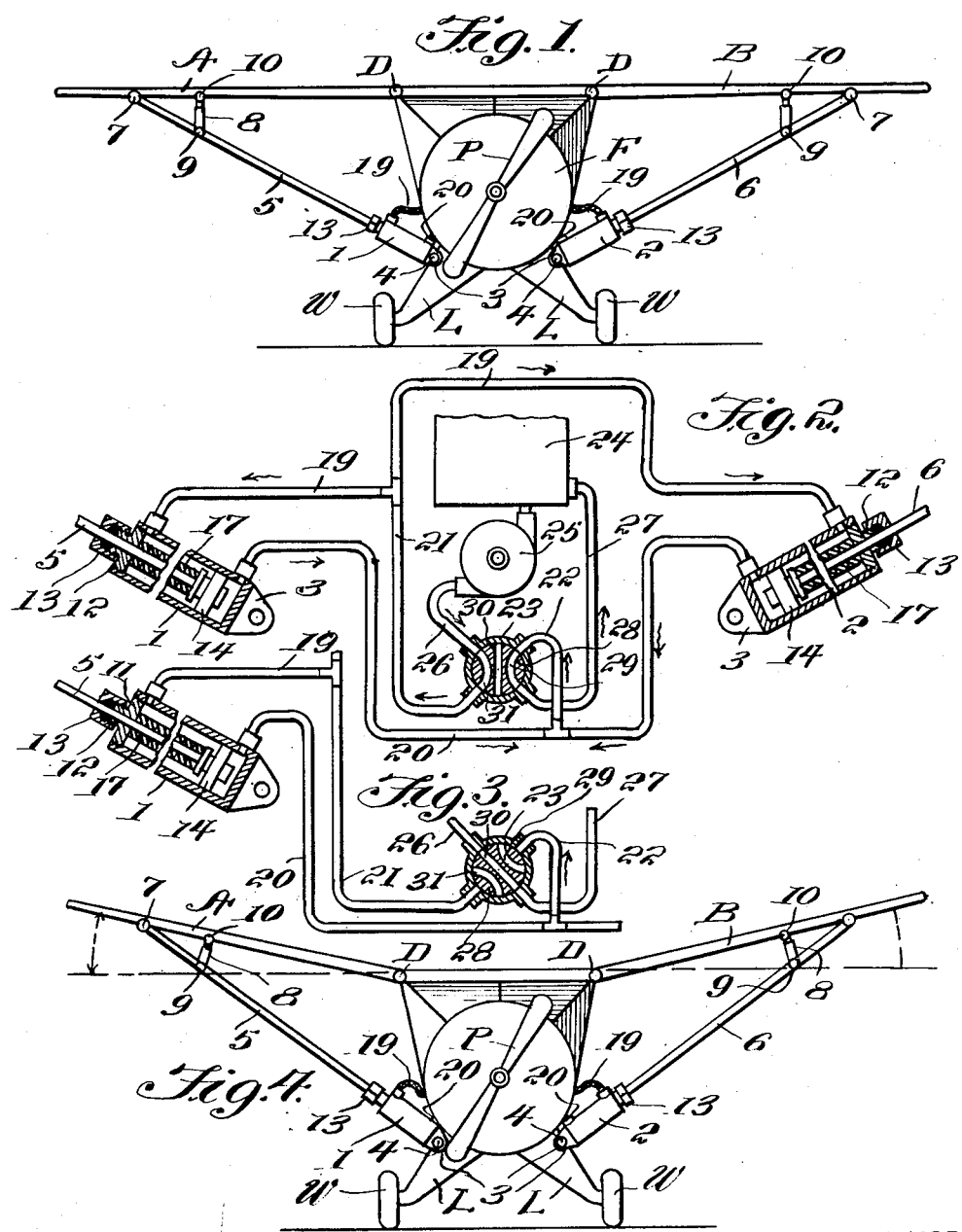
INVENTOR.
Earl G. Metzler,
BY Victor J. Evans & Co.
ATTORNEYS

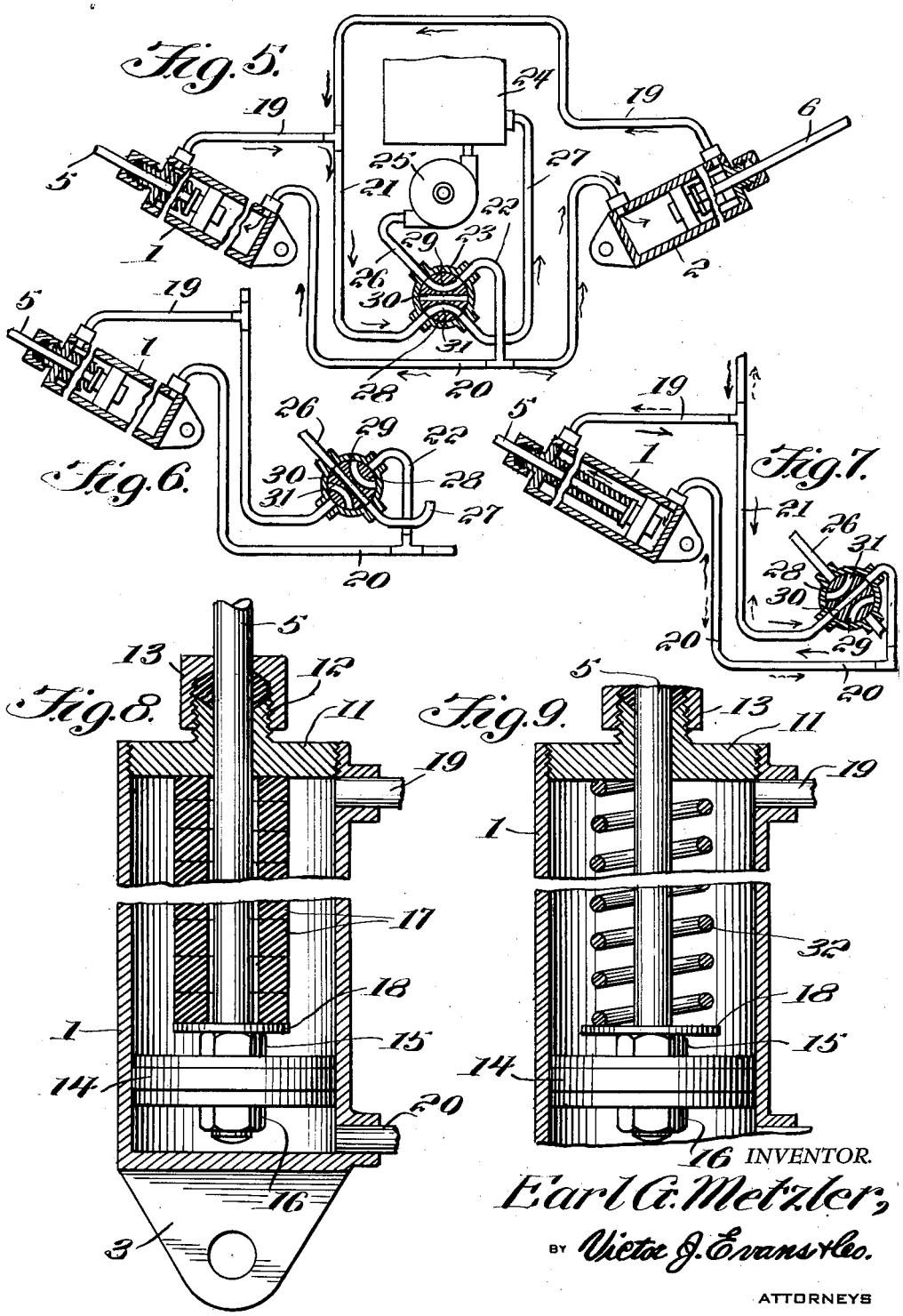

Patented July 15, 1952

2,603,435

UNITED STATES PATENT OFFICE 2,603,435

RESILIENT MOUNTING FOR AIRPLANE WINGS

Earl G. Metzler, Latrobe, Pa.

Application February 6, 1948, Serial No. 6,681

1 Claim. (Cl. 244—38)

My present invention relates to aeronautics and the sustentation of airplanes or aircraft having variable dihedral foils or wings, and more specifically to an improved resilient mounting for airplane wings by means of which the wings may be flexed and adjusted for changing the dihedral angle of the aircraft or airplane.

The primary object of the invention is the production of a combined resilient shock absorbing mechanism and hydraulic or fluid pressure control system forming a component part of the airplane and under manual control by means of which the airplane in flight may be stabilized within a two-range position of the wings for smooth riding, structural strains are absorbed, and the airplane may readily be controlled for maneuvering on the ground in cross winds and under other adverse conditions.

By the utilization of the shock-absorbing and hydraulic controlling system of my invention the variable wings of an airplane may be flexed or raised and lowered to compensate for rough air encountered by the wings, and to absorb shocks that would otherwise cause rough riding of the airplane.

In the physical embodiment of my invention a minimum number of component parts are utilized that may with facility be manufactured at comparatively low cost of production, and the parts may be assembled and installed with convenience, to assure a control for the airplane that is of comparatively light weight, simple in construction and operation, and reliable and efficient in the performance of its required functions.

The invention consists in certain novel features of construction and combinations and arrangements of parts for the above purposes as will hereinafter be described and more particularly set forth in the appended claim.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, as is evidenced by the illustrated modification of the shock absorber, all within the scope of my claims, without departing from the principles of the invention.

Figure 1 is a front elevation of a conventional airplane equipped with the shock-absorbing and control mechanism of my invention, showing the wings in normal extended position, as in flight.

Figure 2 is a diagrammatic view of the resilient shock absorbing and control system, disclosing the hydraulic four-way control valve in section and turned to position for depressing or lowering the wings to the position of Fig. 1; and Figure 3 shows a portion of the hydraulic control mechanism with the valve turned to position for locking the wings in position of Fig. 1.

Figure 4 is a view similar to Fig. 1 with the wings flexed upwardly and indicating the two-position range of flexure for the wings; and Figure 5 shows the hydraulic system with the control valve turned to lifting position of the wings, within the range indicated in Fig. 4.

Figure 6 shows the hydraulic system with the valve turned to locked position to sustain the wings in the upwardly flexed position of Fig. 4.

Figure 7 is a diagrammatic view of the hydraulic system with the control valve turned to permit alternate raising and lowering of the wings.

Figure 8 is a vertical longitudinal sectional view through one of the dual hydraulic and shock-absorbing cylinders, showing a rubber shock absorbing-element; and Figure 9 is a similar view showing a modified form, or spring, for the shock-absorber.

In order that the general arrangement and utility of parts may readily be understood I have illustrated a conventional airplane having the fuselage F and propeller P, together with the landing gear including wheels W and their supporting frame L. The two sustaining wings A and B, or foils, are of the variable type and they may be flexed on their axes D, D, extending longitudinally of the airplane, as indicated by the arrows in Fig. 4 within a range of the two positions.

It will be understood that under normal flight conditions and smooth riding of the airplane, the power of the hydraulic system, or fluid pressure system, is de-energized by manual opening of a control valve, so that the weight of the wings A and B may disperse the hydraulic pressure, leaving the variable wings to ride upon the dual resilient shock-absorbers.

These dual shock-absorbing mechanisms are enclosed within identical or twin power cylinders 1 and 2, each equipped with a pair of supporting flanges 3, drilled to receive pivot bolts 4, by means of which bolts the dual control means are each pivotally supported on the landing gear L, or other suitable support, at opposite sides of the fuselage or body F of the airplane.

Each of the power cylinders is equipped with an outwardly and upwardly extending, reciprocable, strut or plunger rod 5, or 6, with its outer upper end pivotally connected at 7 on the under face of the dihedral wing A or B, and reinforcing braces or links 8, 8, are pivoted at 9 and 10 respectively to the strut or plunger rod and the wing.

Each power cylinder is provided with a removable head 11 having a slide bearing 12 for the strut or plunger bar or rod, and the packed joint of the bearing is secured by a nut 13 threaded on the exterior of the bearing.

At its lower inner end each plunger rod or strut is equipped with a piston or plunger 14 reciprocable in its power cylinder, and the piston or plunger head is fixed in adjusted position by a pair of lock nuts 15 and 16 threaded on the complementary end of the plunger rod.

In Fig. 8, the shock absorbing mechanism includes multiple perforate disks 17, of rubber or other suitable elastic and resilient material, slipped on the lower end of the strut or plunger rod before the piston is mounted thereon, and these multiple shock absorbing elements are interposed between a washer 18 adjoining the lock nut 15 and the inner face of the cylinder head 11.

During the absence of hydraulic or fluid pressure within the dual cylinders, these resilient shock absorbers permit a stabilized flexing of the wings A and B on their axes D, D, and the elastic and resilient multiple disks 17 absorb the shocks to prevent extension of vibrations throughout the connected structures of the airplane.

Under manual control, the dual struts or plunger rods, together with their pistons or plunger heads, may be actuated by hydraulic or fluid pressure to flex the wings A and B within the range between the two positions illustrated; and simultaneously the two wings may be locked by the fluid pressure within the cylinders in adjusted position.

For this purpose the upper ends of the two cylinders are interconnected by a depression pipe 19 having end ports to the cylinders, and the lower ends of the cylinders are interconnected by a lift pipe 20 having end ports to the cylinders below their respective pistons.

The depression pipe 19 has a branch pipe 21, and the lift pipe 20 has a branch pipe 22 that are connected with ports at the opposite sides of a rotary valve casing 23 which is located in a suitable position for ready access by an aviator in manually controlling a four-way rotary valve within the casing.

For supplying the motive fluids to the cylinders a reservoir 24, and a suitable rotary pump 25, are mounted in appropriate positions, and the hydraulic pumping circuit includes a supply pipe 26 from the pump to the control valve casing, and a return pipe 27 from the valve casing back to the reservoir or tank.

For controlling the passage of motive fluid through the valve casing, a cylindrical rotary valve 28 is operatively mounted within the casing and equipped with a supply port 29 adapted to connect the supply pipe 26 with the branch pipe 22 and the lift pipe 20. A straight central port 30 for alternate use in locking the wings, and for releasing the wings so that they will automatically flex, is adapted to connect the supply pipe 26 and the return pipe 27, as shown in Fig. 3 where the wings are locked; and also to connect the depression pipe 19 and the lift pipe 20, as in Fig. 7 to permit free flow of the motive fluid throughout the piping system when the wings are riding on the shock-absorbers.

In the diagram Fig. 2 the valve has been turned to connect the pump pipe 26 with the depression pipe 21—19 for supplying motive fluid to the cylinders above their pistons or plunger heads, thus lowering the wings from uplifted position, and the lower ends of the cylinders are exhausted through the lifting pipe 20 and branch 22, hence through the ported valve to the return pipe 27 for return to the reservoir or tank 24.

For lifting or raising the wings to uplifted position of Fig. 4, the valve is turned as in Fig. 5 so that the motive fluid passes from the pump through supply pipe 26, valve port 29, and branch pipe 22 to the lift pipe 20 for introducing the motive fluid to the lower ends of the cylinders beneath the pistons for lifting the struts or plunger rods; and the motive fluid is exhausted from the upper ends of the cylinders through the depression pipe 19, branch 21, and port 31, thence through return pipe 27 to the reservoir or supply tank.

In the fragmentary diagram of Fig. 6 the valve is turned to segregate the pump supply and return circuit; and the power circuit, including the depression pipe and the lift pipe, is segregated to maintain an equalized pressure within the cylinders at opposite sides of the pistons for locking the dual struts and the dual wings in position.

In Fig. 9 one of the dual power cylinders is provided with a helical spring 32 that forms a modified shock absorber for use in some installations, and this spring is interposed between the head 11 of the cylinder and the washer 18 for the performance of the functions ascribed to the multiple disk shock absorber in Fig. 8.

Having thus fully described my invention, what I claim as new and desire to secure by Letters Patent is:

The combination which comprises an airplane having a fuselage, wings hinged to the opposite sides of the fuselage and hydraulic cylinders pivotally mounted at one of the ends thereof on said fuselage and positioned at points on the lower part thereof, cylinder heads having flat inner surfaces positioned in said cylinders and mounted in the ends of the cylinders opposite to the ends connected to the fuselage, pistons in the cylinders, piston rods mounted in the pistons and extended through said cylinder heads, means connecting extending ends of the piston rods to the said wings, rubber members in the cylinders positioned over said piston rods and substantially coextensive with that portion of the piston rod which extends from the piston to the cylinder head, whereby forces exerted on the pistons by upward thrusts of the wings gradually compresses said rubber members, connections at the ends of said cylinders for introduction of fluid under pressure thereto, a source of fluid under pressure including a pump and pipes leading from said source to said connections, and adjustable rotary valve means in said pipes whereby the rate of flow through said pipes may be controlled and the pressure of fluids in said cylinders be regulated to compensate for excessive pressure resulting from upward thrusts of said wings.

EARL G. METZLER.

REFERENCES CITED

The following references are of record in the file of this patent:

UNITED STATES PATENTS

| Number | Name | Date |
|---|---|---|
| 1,945,254 | Bittner | Jan. 30, 1934 |
| 2,066,649 | Sabins | Jan. 5, 1937 |
| 2,073,350 | Osborn | Mar. 9, 1937 |
| 2,111,134 | Allin | Mar. 15, 1938 |
| 2,186,558 | Rouanet et al. | Jan. 9, 1940 |
| 2,193,125 | Evans et al. | Mar. 12, 1940 |

OTHER REFERENCES

"Product Engineering," Nov. 1942: pages 656 and 657 (Fig. 2).